United States Patent

Karney

[11] Patent Number: 5,136,145
[45] Date of Patent: Aug. 4, 1992

[54] SYMBOL READER

[76] Inventor: James L. Karney, 11360 Alethea Dr., Sunland, Calif. 91040

[21] Appl. No.: 485,832

[22] Filed: Feb. 28, 1990

Related U.S. Application Data

[63] Continuation of Ser. No. 124,274, Nov. 23, 1987, abandoned.

[51] Int. Cl.$^5$ ............................................. G06K 13/00
[52] U.S. Cl. ................................. 235/475; 235/469; 235/472
[58] Field of Search ........................ 235/472, 469, 475; 382/68, 59; 350/96.31

[56] References Cited

U.S. PATENT DOCUMENTS

| | | |
|---|---|---|
| 3,201,764 | 8/1965 | Parker . |
| 3,309,667 | 4/1967 | Felssal . |
| 3,492,660 | 2/1969 | Halverson . |
| 3,519,996 | 7/1970 | Vilkomerson et al. . |
| 3,529,133 | 3/1971 | Kent et al. . |
| 3,643,068 | 2/1972 | Mohan et al. . |
| 3,778,597 | 12/1973 | Vanderpool et al. . |
| 3,784,794 | 1/1974 | Allais . |
| 3,787,823 | 1/1974 | Negishi . |
| 3,792,236 | 2/1974 | Dobras et al. . |
| 3,811,033 | 5/1974 | Herrin et al. . |
| 3,894,756 | 7/1975 | Ward . |
| 4,330,775 | 5/1982 | Iwamoto et al. . |
| 4,488,679 | 12/1989 | Bockhult ............................ 238/469 |
| 4,521,772 | 6/1985 | Lyon .................................. 235/472 |
| 4,542,528 | 9/1985 | Sawner ............................... 235/472 |
| 4,555,731 | 11/1985 | Zinchuk . |
| 4,570,063 | 2/1986 | De Bie et al. . |
| 4,571,032 | 2/1986 | Someya ........................... 350/96.31 |
| 4,591,706 | 5/1986 | Sims .................................. 235/472 |
| 4,614,366 | 9/1986 | North et al. . |
| 4,628,352 | 9/1986 | Boue . |
| 4,641,927 | 10/1987 | Prescott .......................... 350/96.31 |
| 4,652,929 | 3/1987 | Stemme et al. . |
| 4,656,345 | 4/1987 | Kurimoto ......................... 235/472 |
| 4,682,016 | 7/1987 | Inoue ................................ 235/472 |
| 4,707,859 | 11/1987 | Nudd ................................. 382/68 |
| 4,717,965 | 1/1988 | Mashiko et al. .................. 382/59 |
| 4,723,843 | 2/1988 | Zobel ............................. 350/96.31 |

OTHER PUBLICATIONS

"How Japanese Square Route Could Cut the Cost of Coding", by Roy Garner, May 5, 1987, Colin Linn Financial Times.
Public Gaming Magazine, 1986, Jul. pp. 76–77, Application U.S. Ser. No. 013,026 Nov. 10, 1987.

Primary Examiner—Harold Pitts
Attorney, Agent, or Firm—Staas & Halsey

[57] ABSTRACT

A symbol reader is disclosed that uses a dynamic random access memory 24 as a detector element and a gradient refractive index material as the lens 14 to capture a symbol image. The rod shaped lens 14 passes through an opaque cover 26 and confronts the array of memory elements in the memory 24. The cover 26 is glued to a memory device package 28. The PN junctions of the random access memory 24 are activated by light reflected from a symbol 6 and appear as data when the random access memory 24 is read out. The light can be provided by light emitting diodes 34 positioned adjacent to the memory package 28 and in a hand held wand 46 that includes a light reflecting shield 48 in which the symbol is positioned for reading. The wand 46 is positioned over the symbol 6 and a read button 50 is depressed. A computer 58 monitoring the read button 50 activates the light emitting diodes 34 and then reads out the contents of the random access memory 24, unscrambles the data, signals the user that the symbol 6 has been captured and then outputs the symbol image.

18 Claims, 3 Drawing Sheets

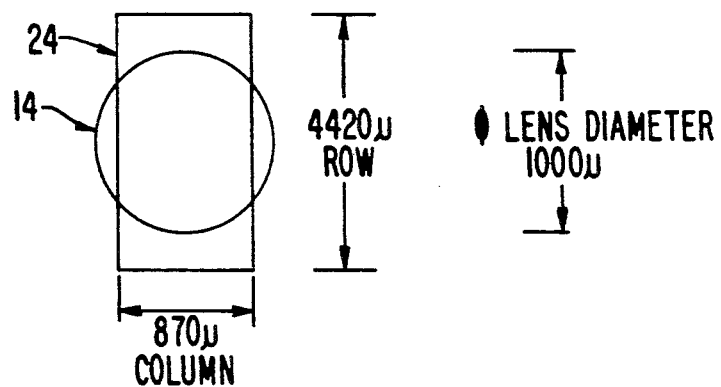
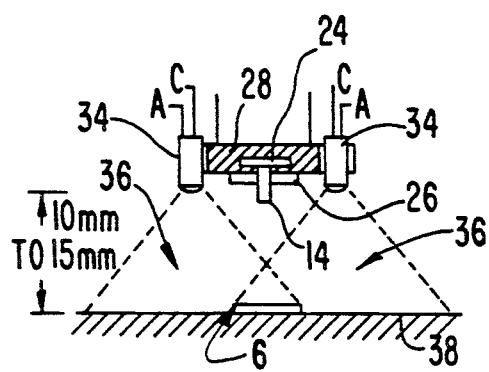
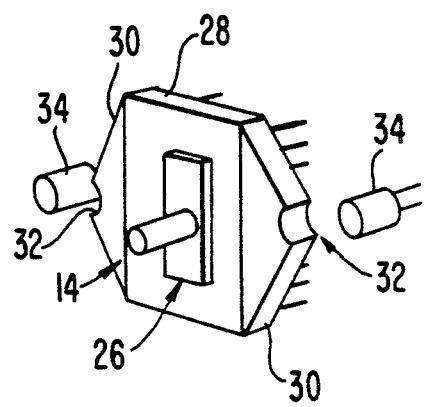
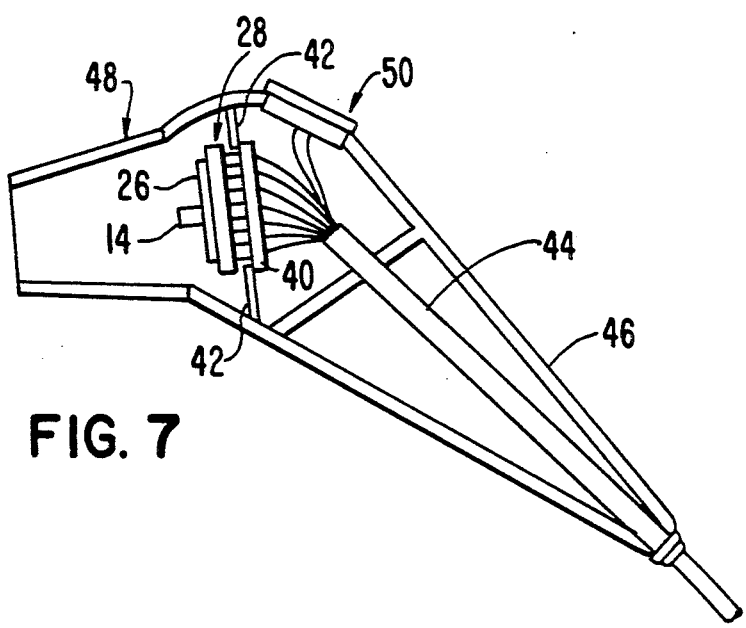

SYMBOL READER

This is a continuation of copending application Ser. No. 07/124,274 filed on Nov. 23, 1987 know abandoned.

CROSS REFERENCE TO RELATED APPLICATIONS

This application is related to U.S. patent application Ser. No. 013,026, entitled AUTHENTICATING PSUEDORANDOM CODE AND APPARATUS by Carl Sant'Anselmo filed Feb. 10, 1987, which is incorporated by reference herein.

BACKGROUND OF THE INVENTION

1. Field of the Invention

The present invention is directed to an optical symbol reader and, more particularly, to a hand held optical symbol reader that uses a random access memory as a light detecting array and a gradient refractive index material as a lens.

2. Description of the Related Art

The encoding of data on parts and retail merchandise has been widely accepted and standardized in the use of a universal product code symbol. The universal product code symbol utilizes a combination of varying width bars and spaces to optically encode data. The use of a symbol that carries information in only one dimension (width) creates inherent limitations due to space restrictions and optical resolution limits of detecting elements. These limitations combine to restrict the amount of data that can be represented by the symbol and prevent its use on small parts and packages. The reading operation for the standard bar code requires either hand scanning over the bar code by moving the light source and detector element or automatic scanning with relatively expensive hardware in which a laser beam is moved across the bar code symbol. This requirement for movement to scan the bar code symbol unnecessarily complicates the scanning task by the operator as well as the equipment associated with detecting the symbol.

SUMMARY OF THE INVENTION

It is an object of the present invention to provide a low cost reader for optical symbols.

It is another object of the present invention to provide a compact hand held reader that does not require movement to scan the symbols.

It is a further object of the present invention to provide a symbol reader that does not require moving parts.

It is still another object of the present invention to provide a reader that can read a symbol in any orientation.

It is a still further object of the present invention to provide a reader that can read symbols with higher information density than prior readers, that is, a reader with a higher resolution.

The above objects can be attained by a symbol reader that uses a random access memory as a detector element and a gradient refractive index material as the lens to capture a symbol image. The PN junctions of the cells in the random access memory are activated by light reflected from the symbol and appear as data when the random access memory is read out. To read the symbol the reader is positioned over the symbol and a read button is depressed. A computer monitoring the read button reads out the contents of the random access memory, unscrambles the data and can output the symbol image.

These together with other objects and advantages which will be subsequently apparent, reside in the details of construction and operation as more readily hereinafter described and claimed, reference being had to the accompanying drawings forming a part hereof, wherein like numerals refer to like parts throughout.

BRIEF DESCRIPTION OF THE DRAWINGS

FIG. 4 is a plan view of a lens 14 mounted on a random access memory 24;

FIG. 5 illustrates illuminators 34 combined with a detecting element according to the present invention;

FIG. 6 is a side view of the detector scanning a symbol 6;

FIG. 7 illustrates a detector mounted in a hand held scanning unit 46;

DESCRIPTION OF THE PREFERRED EMBODIMENTS

Figure 1:
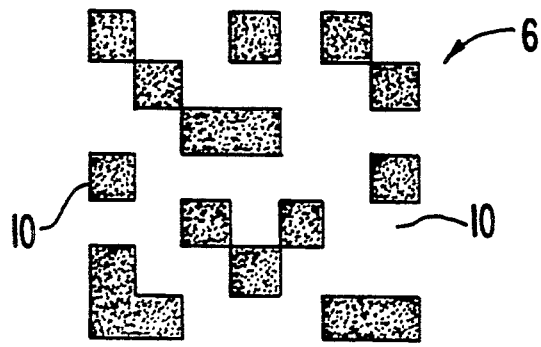
FIG. 1 illustrates a symbol 6 read by a reader of the present invention.
Figure 2:
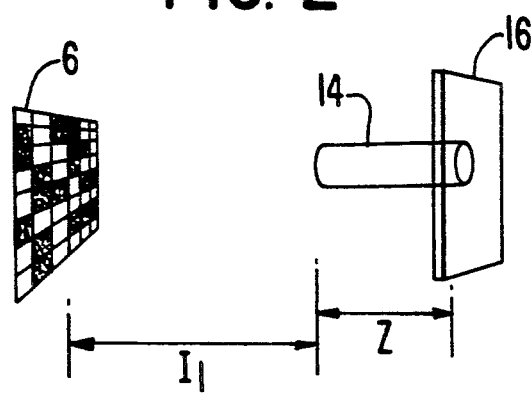
FIG. 2 depicts the lens 14 arrangement of the present invention.
Figure 3:
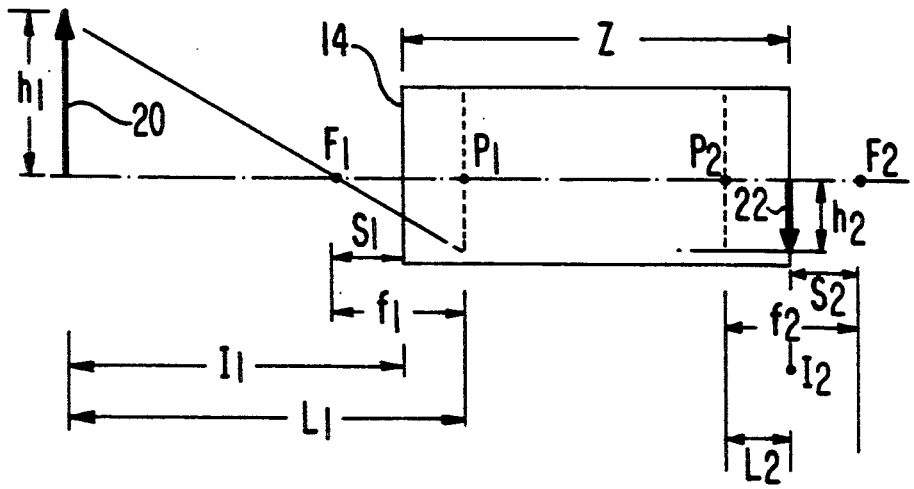
FIG. 3 illustrates the dimensions of the lens 14 in the present invention.

The present invention is designed to read the matrix symbol 6 illustrated in FIG. 1. This symbol 6 is typically less than one-quarter inch square with a matrix of light (light reflecting) and dark (not light reflecting) squares 10 representing bits of data. The symbol 6 can be printed on an adhesive label or other substrate or engraved on an object. Each square 10 is approximately .027 inches on a side. The symbol 6 will encode 49 digital bits which can be divided among data bits and parity bits. If only one square 10 is used as the parity bit, the symbol 6 can be used to represent $2^{48}$ different items which is over twenty-eight billion. When the symbol 6, as illustrated in FIG. 2, is held at a distance $I_1$ from 10 mm to 15 mm from a gradient refractive index material lens 14, with a length z of 6 mm and a diameter of 1.0 mm, the symbol 6 forms an image in a narrow image plane 16. A gradient refractive index lens material is a material which refracts light toward or away from the optical axis. The material is commonly used in aligning semiconductor lasers with fiber optics connectors. The principal difference between such a lens and conventional optics is that refraction processes are occurring within glass rods 0.10 mm³ to 0.001 mm³ in volume. A gradient refractive index lens material also varies its optical, index from the center of the lens to its outer circumference. The optical index N is a function of radial distance r from the center expressed as a function of a gradient constant A as follows: $N(r) = N_0(1 - A/Zr^2)$ where $N_0$ is the optical index of glass. By varying the length z and the gradient constant A, objects can be imaged from a distance of only several millimeters away from the front lens surface. The image location can be designed to occur at the rear surface of the lens or slightly displaced away from the lens depending on the length of the lens. FIG. 3 illustrates the design criteria for a gradient refractive index lens. The focus and image plane of the lens can be designed in accordance with the following formula:

$$f_1 = f_2 = 1/(N_0 \sqrt{A} \sin \sqrt{A} Z) \quad (1)$$

where $f_1$ and $f_2$ are focal distances from principle planes $P_1$ and $P_2$, $$h_1 = h_2 = (1/(N_0 \sqrt{A})) * ((\tan \sqrt{A} Z)/2) \quad (2)$$

where $h_1$ and $h_2$ are image sizes, $$S_1 = S_2 = 1/(N_0 \sqrt{A} * \tan \sqrt{A} Z) \quad (3)$$

where $S_1$ and $S_2$ are distances between the focal points and lens end surfaces, and $$1/f = 1/L_1 + 1/L_2 \quad (4)$$

$$M = -L_2/L_1 \quad (5)$$

where $L_1$ is the distance between the object and principle plane $P_1$, $L_2$ is the distance between image and principle plane $P_2$ and M is the magnification factor. The object 20 is translated into an image 22 at the rear surface or slightly offset away from the rear surface of the lens. The lens 14 will reduce the image size occurring at the exit surface by a factor of 10 to 20 from that of the object. A lens having a length of 6 mm and a diameter of 1.0 mm, resulting in a working distance of 10–15 mm will produce a magnification of approximately 10 to 1 thereby reducing a 7 mm by 7 mm symbol to a 0.7 mm by 0.7 mm image. This reduced image will fit comfortably within the 1 mm lens exit surface and within a random access memory element array dimension of 0.877 mm. A suitable gradient refractive index lens material can be obtained from NSG America and is designated a ZSLW micro lens. A suitable random access memory device can be obtained from Micron Tech and is designated ZS-32. The preferred memory includes a 128X256 array of memory elements producing 32,768 pixels and allowing the memory and lens combination to have an image resolution of 70 microns. Higher resolution will be possible with dynamic random access memories having higher element density. For example, a memory with 1024X1024 elements in a 0.877 mm array might produce a resolution of 7 to 14 microns.

FIG. 4 illustrates the mapping of the lens 14 onto an array of PN junctions found in a dynamic random access memory 24. Since the PN junctions in the random access memory 24 can be stimulated to conduct current by light, the light image incident on the PN junction array activates corresponding memory elements of the array, so that the contents of the memory 24 represent the light and dark regions of the symbol image.

A typical dynamic random access memory 24 is sold with a opaque cover which can be removed and replaced by a lens 14 and mounting plate 26. The lens 14 is mounted on the surface of the memory array by inserting the lens 14 through an opaque mounting plate 26 as illustrate in FIG. 5 the lens 14 should protrude through the mounting plate 26 far enough to contact the array and is bonded to the array using a conventional optical cement. The lens 14 is held in the plate 26 by epoxy glue. The mounting plate 26 takes the place of the opaque cover for the memory 24 and is held in place by epoxy glue. The device package has light emitting diode mounts 30 with recesses 32 glued or molded to the side of the memory package 28. Light emitting diodes 34 are glued in the mounting recesses 32. The light emitting diodes are provided to ensure that an energy of at least $2\mu joules/cm^2$ falls on those elements that should detect light reflecting portions of the symbol 6. Suitable red-diffused light emitting diodes driven at 2.0 volts at a pulse rate of 4 per second, can be obtained from Hewlett Packard and are designated T-1 ¾ diodes.

FIG. 6 illustrates a cutaway view of the package 28 showing the illumination regions 36 for the target surface 38.

FIG. 7 is a cutaway view of a hand held scanner or wand housing 46 incorporating the detector configuration of FIG. 5. The memory package 28 is inserted in a package connector 40 which is glued to mounting members 42. The connector 40 connects the address and data lines of the package 28 to a cable 44 passing through the hand held unit 46. The front of the hand held unit includes a tapered light reflecting shield 48 which increases the amount of light reaching the symbol 6. The shield is 20 mm in diameter at the end and 10 to 15 mm long. Mounted in the top of the hand held unit 46 is a sample button 50 which is depressed to capture the image seen by the detector. The user positions the shield 48 around the symbol 6 and depresses the button 50 to capture the image. A computer 58 will signal the user when the image has been captured.

Figure 8:
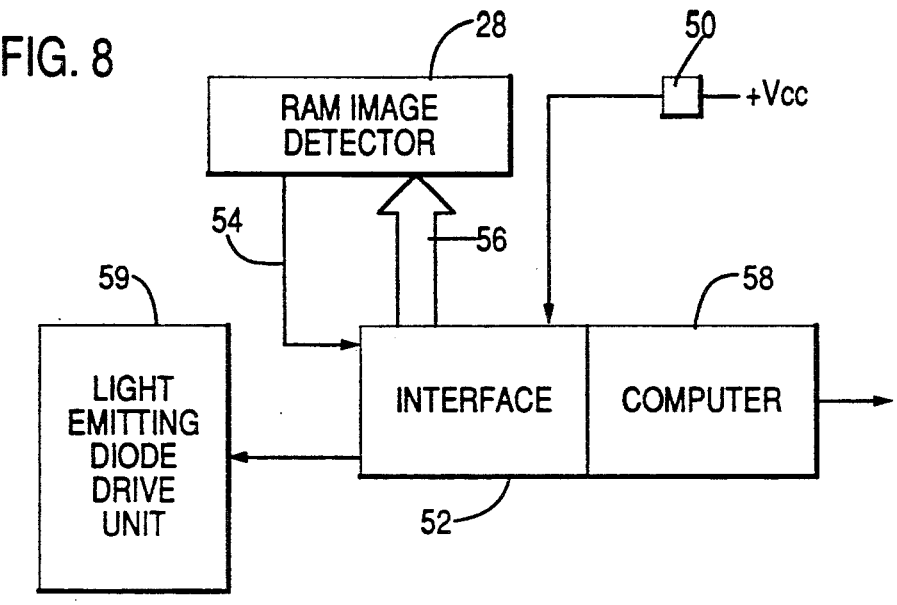
FIG. 8 illustrates an apparatus that reads the contents of the detector and output the symbol image.

The detector 28 is connected to converting interface 52 by a data line 54 and address lines 56, as illustrated in FIG. 8. An appropriate interface 52 can be obtained from Micron Technology, Inc. and is designated as a Micron Camera Board. The interface 52 also includes a connection to the capture switch 50 which allows computer 58, through interface 52, to determine whether the capture switch 50 has been depressed. When the capture switch 50 has been depressed, the computer 58 activates a standard light emitting diode drive unit 59 and then reads out the contents of the image detector 28 by sequentially addressing the 256 by 128 bits of the detector 28. A suitable computer 58 is a an IBM-AT microcomputer. The preferred memory is bit addressable requiring that the computer read out all memory locations before the user is allowed to move the hand held unit 46 away from the symbol 6. Since the preferred memory has a cycle time of 200–300 milliseconds, the complete read out operation can be performed in 0.3 to 0.5 seconds. It is, of course, possible to substitute a byte addressable memory for the preferred memory. When the image has been captured by the computer 58, the computer signals the user using an audible beep.

Figure 9:
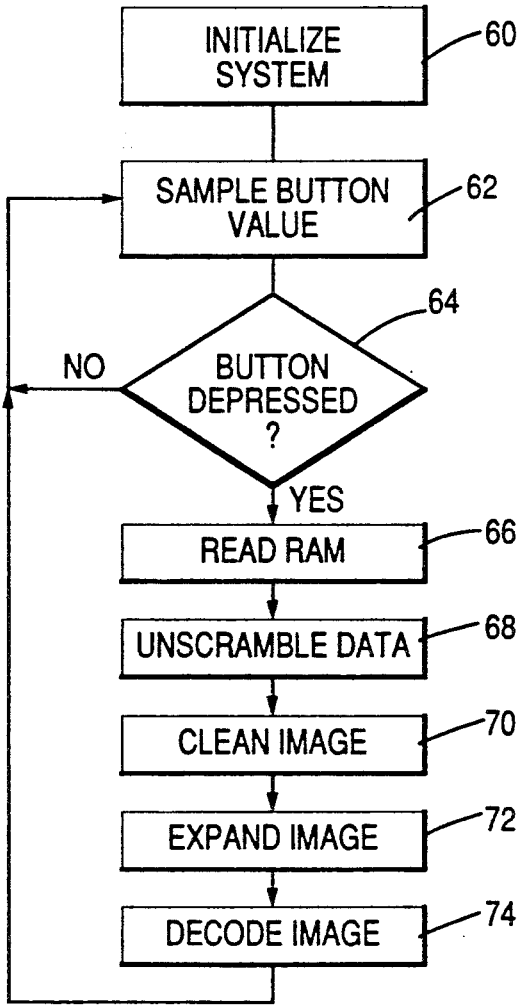
FIG. 9 illustrates the software for scanning and outputting the symbol image.

The computer 58 prior, to beginning the sequence associated with acquiring the image, as illustrated in FIG. 9, initializes 60 the system by performing self checks of the interface 52 input and output ports and refreshes the dynamic random access memory 28. Next the computer 52 polls 62 the interface bit corresponding to button 50. If the button is depressed 64, the memory is cleared, and then the contents of the memory 28 are read out by the computer by sequentially incrementing the address applied to the memory 28 through all memory locations while shift storing the incoming data from the random access memory 28 into a data register that will hold a single byte.

Because the physical arrangement of the memory cells is not necessarily in a regular pattern that is, sequential memory cell addresses may not be physically located next to each other, it is necessary to unscramble 68 the data which is read out from the memory 28. One of ordinary skill in the art can determine the transformation sequence necessary to unscramble the data for any memory element detector by reading out the image from a series of test patterns and comparing the output data to the actual test pattern. A suitable test pattern is a pair of crossed lines which can be moved around in the image field of the detector to map the transformation in all areas of the random access memory used for detection. For the preferred dynamic random access memory, the transformation or mapping algorithm uses a transformation or translation table stored in a read only memory which includes the address in which each bit of the acquired image should be stored. That is, the table includes destination addresses for sequentially addressed bits.

Once the image is unscrambled, a convention 3 by 3 convolution image processing algorithm or filter is used to remove 70 noise in the image. In the preferred algorithm, the eight bits surrounding the bit in a three by three square are examined and if the surrounding bits are a different value then the center bit is inverted. Once the image is noise free, the image can be output by the computer 58 or the computer 58 can perform additional processes that make the computer 58 output more useful.

To make the image easier to process, the image can be expanded 72 by converting the 256 by 128 bit image into a 256 by 256 byte image. To convert the bit image into a byte image, each bit is examined and converted into a corresponding byte either by converting the image data using a mask and a logical operation or shifting each line of the bit image data left in a register to produce a carry out which will indicate the value of each bit. The expansion along the short axis will convert each bit along the short axis into two bytes of the same value.

The computer 58 can also decode 74 the image by determining the value of each square 10 through data sampling, compressing the values into a string of bits, comparing the bits to a symbol table and outputting a symbol identifier.

The present invention is not only useful for electronic checkout type cash registers and inventory control, but can also be used in children's reading books to allow a child who is learning to read to determine the words in a reader.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, it is possible for the present invention to be used as an optical alphanumeric character reader or a bar code reader. A memory with a faster read operation would allow the user to move the wand sooner.

What is claimed is:

1. A symbol reader, comprising:
   a random access memory with memory elements arranged in two dimensions and exposed to light, said memory elements providing two dimensional symbol image capture and storage of the two dimensional symbol image and producing a binary image; and
   a single gradient refractive index rod lens, contactingly bonded to said random access memory forming a bond and directly focusing focal plane light from a two dimensional symbol onto said random access memory elements through the bond by reducing the two dimensional symbol image.

2. A symbol reader, comprising:
   a random access memory with memory elements arranged in two dimensions and exposed to light, said memory elements providing two dimensional symbol image capture and storage of the entire two dimensional symbol image; and
   two dimensional focusing means for focusing light from a two dimensional symbol onto said random access memory elements through a bond between said focusing means and said memory by reducing the two dimensional symbol image and comprising a single gradient refractive index rod lens contactingly bonded to said memory forming the bond.

3. A reader as recited in claim 2, wherein said lens is 6 mm long and 1.0 mm in diameter.

4. A reader as recited in claim 2, further comprising an opaque cover having a hole through which said lens passes and said cover attached to said memory.

5. A reader as recited in claim 2, further comprising mapping means for rearranging outputs of said memory into the image representing the symbol.

6. A reader as recited in claim 5, wherein said mapping means comprises a computer including a translation table for translating the outputs into the image data.

7. A reader as recited in claim 2, further comprising lighting means for illuminating the symbol.

8. A reader as recited in claim 7, wherein said lighting means comprises a light emitting diode positioned adjacent to said memory and emitting light toward the symbol.

9. A reader as recited in claim 8, further comprising a hand held housing holding said memory, said focusing means and said light emitting diode, and including a light reflecting shield reflecting light from said light emitting diode onto the symbol.

10. A two dimensional symbol reader, comprising:
    detector means for detecting and storing a binary image of an entire two dimensional symbol at one time; and
    a single gradient refractive index rod lens contactingly bonded to said detector means forming a bond and directly conveying a two dimensional focal plane image of the symbol to said detector means through the bond by reducing the two dimensional image.

11. A symbol reader, comprising:
    a random access memory having memory elements exposed to light, the memory elements providing two dimensional symbol image capture and storage of the entire two dimensional symbol image;
    a single gradient refractive index rod lens providing two dimensional symbol and being contactingly bonded to said memory;
    an opaque cover attached to said memory and having a hole through which said lens passes;

a light emitting diode positioned adjacent said memory and emitting light toward the symbol; and a hand held housing holding said memory, said lens, said cover and said diode, and including a tapered light reflecting shield.

12. A method of scanning a symbol using a single gradient refractive index lens providing a two dimensional image and a random access memory imaging unit contactingly bonded to the lens forming a bond and providing two dimensional image capture and storage, comprising the steps of:

(a) positioning the imaging unit to see the entire two dimensional symbol and directly providing a reduced two dimensional focal plane image of the entire symbol to the random access memory through the bond;

(b) clearing the random access memory imaging unit contents; and (c) reading out binary image contents of the random access memory imaging unit.

13. A method as recited in claim 12, further comprising the step of (d) converting the contents into a data image by mapping the contents into image positions by rearranging outputs of the random access memory.

14. A method as recited in claim 12, wherein the imaging unit includes a sample button and said method further comprises the steps of monitoring the sample button to initiate step (b) and signalling when step (c) is completed.

15. A method as recited in claim 12, wherein said imaging unit includes a light source for illuminating the symbol and said method further comprises the step of turning on the light source prior to step (c).

16. A method of scanning a symbol using a single gradient refractive index rod lens providing a two dimensional symbol image and a random access memory imaging unit contactingly bonded to said lens forming a bond and providing two dimensional image capture and storage and including a sample button and a light source, said method comprising the steps of:

(a) positioning the imaging unit to see the two dimensional symbol and providing a reduced, entire two dimensional image directly to the random access memory through the bond;

(b) monitoring the sample button;

(c) illuminating the symbol responsive to the sample button;

(d) clearing the random access memory imaging unit contents;

(e) reading out the two dimensional image contents of the imaging unit after illuminating the symbol;

(f) signaling image capture responsive to read out completion; and (g) mapping the random access memory imaging unit contents.

17. A reader as recited in claim 1, wherein said memory captures the symbol at any orientation.

18. A method as recited in claim 16, wherein said imaging unit is positioned at any orientation with respect to the two dimensional symbol.

* * * * *